Aug. 7, 1962 — W. A. LEDWITH — 3,048,010
SWIVELING NOZZLE FOR SOLID ROCKET
Filed Jan. 4, 1960
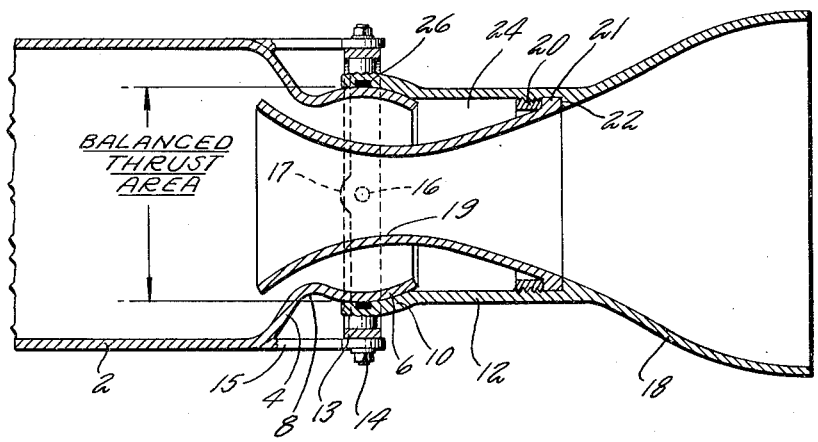
INVENTOR
WALTER A. LEDWITH
BY Charles A. Warren
ATTORNEY 3,048,010
SWIVELING NOZZLE FOR SOLID ROCKET
Walter A. Ledwith, Glastonbury, Conn., assignor to United Aircraft Corporation, East Hartford, Conn., a corporation of Delaware
Filed Jan. 4, 1960, Ser. No. 299
5 Claims. (Cl. 60—35.55)

The present invention relates to a swiveling nozzle for directional control of a rocket. One feature of the invention is the balancing of the axial loads on the nozzle to minimize the pressures on the swiveling mounting. Another feature is an arrangement for minimizing the effects of thermal expansion on the mounting structure.

Another feature of the invention is the minimizing of pressure loading on the nozzle throat thereby to reduce the strength requirement for the throat portion of the nozzle.

Other features and advantages will be apparent from the specification and claims, and from the accompanying drawing which illustrates an embodiment of the invention.

The single figure is a longitudinal sectional view through the nozzle.

The rocket construction includes a combustion chamber 2 having a head 4 at one end which carries a part-spherical ring 6 surrounding an opening 8 in the head 4. Mounted on the part-spherical ring 6 is a cooperating part-spherical ring 10 mounted on the upstream end of a sleeve or cylinder 12. The external part-spherical ring 10 is so constructed that endwise assembly is permissible, the parts being normally held together in assembled relation by a suitable gimballing mechanism. This may be a ring 13 pivotally supported by pins 14 in brackets 15 on the combustion chamber 2. The ring 13 in turn is connected by pivot pins 16 to the part-spherical ring 10, the pins engaging in lugs 17 on the part-spherical ring. The pins 14 are at right angles to the pins 16 and thus permit swiveling of the ring 10 in the supporting surface.

The sleeve 12 has at its downstream end a divergent annulus 18 forming the divergent portion of the nozzle flow path. This ring, as will be apparent, may be integral with the sleeve 10 for convenience of manufacture.

Positioned within the opening 8 and within the sleeve 10 is the tube or annulus 19 forming the convergent-divergent throat for the nozzle. This annulus 19 may be attached adjacent its downstream end to the sleeve 12 as by a clamping ring 20 which holds a flange 21 on the nozzle against shoulder 22 carried by the sleeve 12. The throat-forming ring is spaced radially inward from the opening 8 and from the sleeve 12 except at its downstream end so that pressure within the combustion chamber enters the annular space 24 between the throat-forming ring and the surrounding structure. In this way the material forming the annulus 19 is not required to carry any substantial radial bursting pressures and can be made of a relatively thin material capable of withstanding the temperature effects thereon when the nozzle is in operation.

The cooperating part-spherical rings 6 and 10 permit the swiveling of the nozzle through a small angle and thereby permit directional control of the rocket. To accomplish this, it will be apparent that the throat-forming annulus 19 is so constructed that it will not come in contact with the surrounding structure even when the nozzle has been pivoted through a small angle. A suitable seal 26 may be provided between the two-part spherical rings.

The diameter of the spherical rings and seal 26 are so selected that the axial pressures acting on the nozzle will be balanced as nearly as possible. To accomplish this, the chamber pressure acting externally on the annulus 19 will balance the upstream pressures acting internally on this annulus so that the pressures are balanced to the diameter indicated, which is the diameter of the seal 26. By minimizing or balancing the thrust forces in this manner, pressure acting on the swiveling mounting is kept to a minimum and only a small actuator is necessary for directional control of the nozzle.

It is to be understood that the invention is not limited to the specific embodiment herein illustrated and described, but may be used in other ways without departure from its spirit as defined by the following claims.

I claim:
1. A nozzle mounting for a rocket including a combustion chamber, a nozzle having a convergent-divergent throat portion having inner and outer walls exposed to combustion chamber pressure and a divergent portion downstream of the throat, a supporting structure for said nozzle, a sleeve extending forwardly from and supporting the divergent portion of the nozzle, said sleeve being in surrounding spaced relation to the throat portion, said sleeve having at its forward end a part-spherical seat, a cooperating spherical surface on said structure, said seat and spherical surface surrounding and being spaced from the throat portion outer wall of said nozzle to form a chamber therebetween having a continuous opening proximate to said combustion chamber.

2. A nozzle mounting as in claim 1 in which the sleeve is integral with and extending forwardly from the divergent portion.

3. A nozzle mounting as in claim 1 in which the sleeve is integral with and extends forwardly from the divergent portion, and in which the throat of the nozzle is removably attached to the divergent portion and positioned within and spaced from the sleeve.

4. A rocket construction including a combustion chamber having a discharge opening therein and a ring having an external part-spherical surface thereon substantially at the periphery of said opening, a thrust nozzle including a throat portion having inner and outer walls exposed to combustion chamber pressure, said throat portion being located within and spaced from the discharge opening to define an annular chamber around said throat portion having a continuous opening proximate to said combustion chamber, and said nozzle including a divergent end portion to which the throat portion is connected, said end portion having a forwardly extending sleeve carrying a ring with an internal part-spherical surface on its forward end, said part-spherical rings being in interengagement to hold the throat portion in position within and spaced from the combustion chamber opening.

5. A rocket construction including a combustion chamber having a discharge opening therein and a ring having an external part-spherical surface thereon substantially at the periphery of said opening, a thrust nozzle including a throat portion within and spaced from the discharge opening to define an annular chamber around said throat portion and a divergent end portion to which the throat portion is connected, said end portion having a forwardly extending sleeve carrying a ring with an internal part-spherical surface on its forward end, said part-spherical rings being in interengagement to hold the throat portion in position within and spaced from the combustion chamber opening, said throat portion being connected at its downstream end to the divergent end portion and being supported thereby, the throat portion being thin-walled and being otherwise free of attachment to the divergent end portion and spaced from the combustion chamber ring such that the throat portion is exposed on both the inner and outer faces thereof to the pressure within the combustion chamber and is movable relative to the discharge opening by pivotal movement about the coinciding centers of the part-spherical surfaces.

References Cited in the file of this patent

UNITED STATES PATENTS

| | | |
|---|---|---|
| 2,693,371 | Nelson | Nov. 2, 1954 |

FOREIGN PATENTS

| | | |
|---|---|---|
| 213,206 | Australia | Aug. 22, 1957 |
| 697,721 | Great Britain | Sept. 30, 1953 |